United States Patent [19]

Oinoue et al.

[11] Patent Number: 4,575,626

[45] Date of Patent: Mar. 11, 1986

[54] APPARATUS FOR DETECTING FOCUS CONDITIONS OF AN IMAGING OPTICAL SYSTEM

[75] Inventors: Kenichi Oinoue, Tokyo; Kenji Kimura, Tachikawa; Masatoshi Ida, Hachioji, all of Japan

[73] Assignee: Olympus Optical Co., Ltd., Tokyo, Japan

[21] Appl. No.: 504,319

[22] Filed: Jun. 14, 1983

[30] Foreign Application Priority Data

Jun. 17, 1982 [JP] Japan ............................. 57-103086

[51] Int. Cl.⁴ ................................................ G01J 1/20
[52] U.S. Cl. ..................................... 250/201; 354/407
[58] Field of Search ............... 250/201, 204; 354/406, 354/407; 356/1, 4

[56] References Cited

U.S. PATENT DOCUMENTS

| 4,185,191 | 1/1980 | Stauffer | 250/204 |
| 4,373,791 | 2/1983 | Araki | 250/201 |
| 4,417,139 | 11/1983 | Kusaka | 250/204 |
| 4,419,574 | 12/1983 | Kawabata et al. | 250/204 |

Primary Examiner—Davis L. Willis
Assistant Examiner—J. Gatto
Attorney, Agent, or Firm—Parkhurst & Oliff

[57] ABSTRACT

An apparatus for detecting focus conditions of an imaging optical system is disclosed. The apparatus comprises a light flux dividing means having a plurality of light flux dividing elements arranged at a predetermined focal plane or near a plane conjugated therewith, a photoelectric conversion means having a plurality of light receiving elements arranged to receive light fluxes divided by respective light flux dividing elements in line therewith and means for detecting focus conditions of the imaging optical system based on the outputs of the light receiving elements. The photoelectronic conversion means is so arranged that the cross-section of light fluxes incident upon respective light receiving elements at the exit pupil of the imaging optical system includes regions which are not overlapped with each other.

9 Claims, 42 Drawing Figures

APPARATUS FOR DETECTING FOCUS CONDITIONS OF AN IMAGING OPTICAL SYSTEM

BACKGROUND OF THE INVENTION

The present invention relates to an apparatus for detecting focus conditions of an imaging optical system in a camera, microscope or the like.

A technique has been disclosed in, for example, Japanese Patent Laid-open Nos. 60,645/73 and 95,221/77, by which light flux transmitted through the right half part of the exit pupil of an objective lens and light flux transmitted through the left half part of the exit pupil are separated by a proper separation means, and photoelectrically converted into signals having waveforms corresponding to respective images, and phase shifts of both signals are compared with each other thereby obtaining signals representing forwardly- and backwardly-defocused conditions and the in-focused condition. The former utilizes a vibrating slit as a light flux dividing means resulting in the necessity of mechanically movable components and the latter must provide a relay lens at the rear of a predetermined focal plane of the objective lens; the latter requiring comparatively wide space so that, in any case, it is impossible to derive, with adequate high correlation, the photoelectrically converted output of light fluxes transmitted through two regions defined by a plane including the optical axis of the objective lens.

Japanese Patent Laid-open No. 159,259/79 discloses a focus condition detecting apparatus in which a plurality of microlens arrays are provided instead of a relay lens, with a plurality of paired light receiving elements corresponding to respective microlenses, and these paired light receiving elements are arranged in an array corresponding to the microlens array. In this focus condition detecting apparatus the light quantity distribution of light flux transmitted through one region of the objective lens defined by a plane including the optical axis of the exit pupil and the light quantity distribution of light flux transmitted through the other region of the objective lens are compared with a ratio of 1:1 for respective light receiving element pairs to any position of the objective lens. The position of the objective lens at which two light quantity distributions completely coincide with each other is referred to as the in-focus position. In such an apparatus the paired light receiving elements corresponding to respective microlenses are arranged in such a manner that light flux transmitted through one region of the exit pupil of the objective lens and light flux transmitted through the other region of the exit pupil are incident upon the paired light receiving elements in a completely separated manner. When the opened angle of major light ray of both light fluxes incident upon the paired light receiving elements is large and thus the defocused amount becomes large, as in the case of utilizing an imaging lens or the like having a large extension amount thereof such as a single-lens reflux camera whereby lateral shift becomes large, the image portion necessary for obtaining correlation is shifted from the light receiving element. This results in the impossibility of detecting focus condition with high precision and the incapability of detecting the focus condition. As a method of preventing such disadvantages, a light receiving element having a large light receiving area has been provided; however, this results in an increase of manufacturing cost of light receiving elements because of a decrease in yield and the necessity for excess packaging space, and, in any event, enlargement of the light receiving area is limited because of the relative position of paired light receiving elements.

SUMMARY OF THE INVENTION

It is an object of the present invention to eliminate the above described disadvantages of the conventional focus condition detecting apparatus.

It is another object of the present invention to provide a focus condition detecting apparatus having small and which is simple construction and capable of detecting focus conditions with high precision.

According to the present invention there is provided an apparatus for detecting focus condition of an imaging optical system comprising: a light flux dividing means having a plurality of light flux dividing elements arranged at a predetermined focal plane or near a plane conjugated therewith;

a photoelectric conversion means having a plurality of light receiving elements arranged to receive light fluxes divided by respective light flux dividing elements in line therewith and so arranged that the cross-section of light fluxes incident upon respective light receiving elements at the exit pupil of the imaging optical system includes regions which are not overlapped with each other; and means for detecting focus conditions of the imaging optical system based on the output of the light receiving elements.

Respective light fluxes incident upon respective adjacent light receiving elements of the photoelectronic conversion means at the exit pupil of the imaging optical system cross the optical axis of the imaging optical system. The light flux dividing means comprise a microlens array. The focus condition detecting means favorably comprises means for interpolating outputs of light receiving elements of at least one of light receiving element groups which consist of odd numbered light receiving elements and even numbered light receiving elements of the photoelectronic conversion means.

DESCRIPTION OF THE PREFERRED EMBODIMENT

Figure 1:
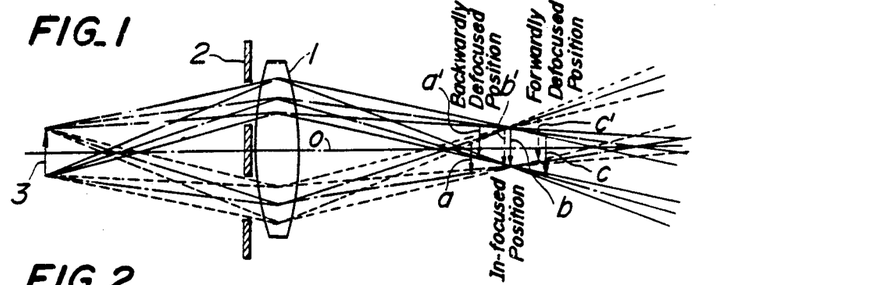
FIG. 1 is a schematic view showing the principle of the image lateral shift detection method.

FIG. 1 shows the principle of focus detection by the image lateral shift detection method. As is known, in the lateral shift detection method images formed by respective light fluxes transmitted through respective half regions of an imaging lens, which are defined by a plane including an optical axis thereof, cause lateral shift in accordance with the amount of defocusing.

As shown in FIG. 1, light fluxes incident upon an imaging lens 1 from an object 3 to be photographed through a diaphragm 2 having an opening provided around an optical axis O of the lens 1 are transmitted through upper and lower half regions of lens 1. Images formed by light fluxes transmitted through the upper and the lower regions of the imaging lens 1 are projected upon a detecting plane. In this case, relative positions of images a, b, and c formed by light fluxes transmitted through the upper region of the lens 1 and images a', b', and c' formed by light fluxes transmitted through the lower region of the lens 1 are different from each other in accordance with a backwardly-defocused condition, an in-focus condition, and a forwardly-defocused condition, respectively. When such a phenomenon is utilized, the light fluxes transmitted through the upper region of the imaging lens 1 and the light fluxes transmitted through the lower region can be separated thereby detecting lateral shift direction and lateral shift amount of the images formed by respective light fluxes resulting in the capability of detecting focus conditions.

Figure 2:
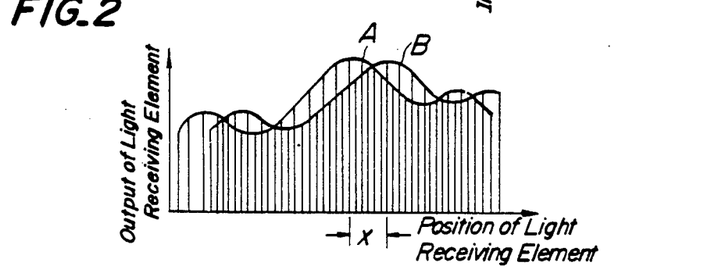
FIG. 2 is a graph showing an output distribution of light receiving elements arrays based on the lateral shift detection method.

FIG. 2 shows one example of output signal distributions A and B obtained by receiving and photo-electrically converting images formed by light fluxes transmitted through the upper and lower regions of the imaging lens 1 upon and by respective light receiving elements. In this case phase difference x of both signals corresponds to lateral shift amount.

Figure 3:
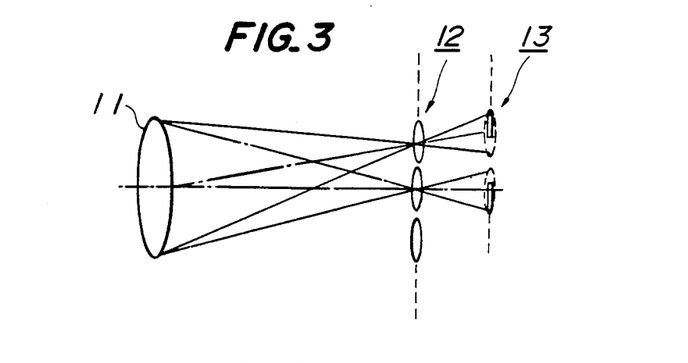
FIG. 3 is a schematic view showing a diagrammatic construction of one embodiment of an optical system for use in a focus condition detecting apparatus according to the present invention.

FIG. 3 is a diagram showing one embodiment of an optical system of the focus condition detecting apparatus according to the present invention. In this embodiment, a microlens array 12 is arranged at a predetermined focal plane of an imaging optical system 11 or near thereof and exit pupil images of the imaging optical system 11 are imaged through the microlens array 12 upon a light receiving element array 13 comprising respective light receiving elements corresponding to respective microlenses with a ratio of one to one. As seen from parts of the microlens array 12 and the light receiving element array 13 of FIG. 4, respective light receiving elements 13-1 to 13-5 of light receiving element array 13 are arranged in such a manner that the section of light fluxes incident through corresponding microlenses 12-1 to 12-5 at the exit pupil of the imaging optical system 11 (refer to FIG. 3) includes the optical axis of the imaging optical system 11. Odd numbered light receiving elements 13-1, 13-3, . . . and even numbered light receiving elements 13-2, 13-4, . . . principally receive light fluxes transmitted through opposite regions of the exit pupil defined by a plane including the optical axis.

Figure 5:
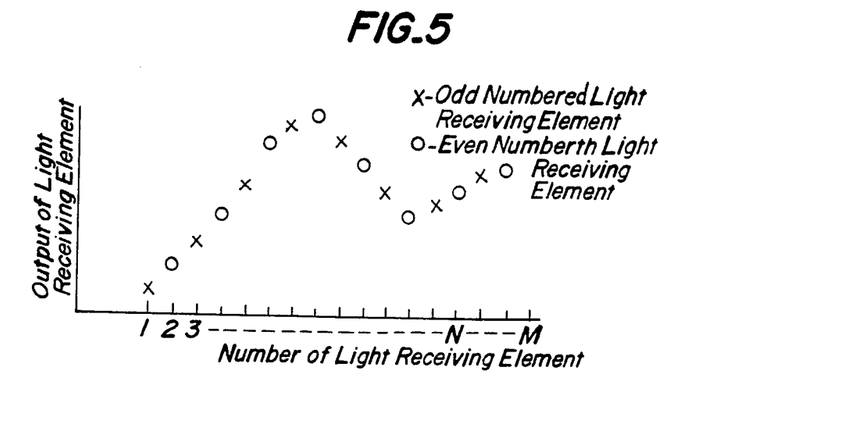
FIG. 5 is a graph illustrating the output distribution of light receiving element arrays used in the focus condition detecting apparatus according to the present invention.

In this way, an output distribution of light receiving element 13 can be obtained as shown in FIG. 5. In this case, output distribution of odd numbered light receiving elements shown by sign x and output distribution of even numbered light receiving elements shown by sign o correspond substantially with each other at the in-focused condition and cause lateral shift in accordance with shift directions and shift amount at the defocused condition. In this embodiment, therefore, opto-electrically converted outputs of respective light receiving elements of the light receiving element array 13 are sequentially read out thereby detecting focus condition based on a comparison of the output distribution of the odd numbered light receiving element group with the output distribution of the even numbered light receiving element group as in the conventional manner.

According to the above embodiment, one microlens corresponds to one light receiving element so that a light receiving element having the required size can easily be utilized as a light receiving element. Moreover, the cross-sections of light fluxes incident upon each of the adjacent light receiving elements at the exit pupil image of the imaging optical system 11 include the optical axis of the imaging optical system 11 and the light fluxes transmitted through both regions of the exit pupil defined by a plane including the optical axis are principally incident upon each of the adjacent light receiving elements so that the light receiving elements can easily be made large. At the same time, when an imaging lens having a large extension amount is used such as the single-lens reflux camera, if the defocused amount becomes large the focus condition can always be detected without shifting the image from the light receiving element. That is, provided that the light ray which divides an angle between light rays incident upon both edges of respective light receiving elements into two equal parts is a principal light ray, the angle between this principal light ray and a central light ray of the microlens is $\theta$, and the defocused amount is $\Delta$, the lateral shift amount t can be represented as follows:

$$t = 2\Delta \tan \theta$$

$\theta$ is $\frac{1}{2}$ of the opened angle between the principal light rays of both light fluxes incident upon the adjacent light receiving elements, and can be made small as compared with the case where light fluxes transmitted through both regions defined by a plane including the optical axis of the exit pupil correspond to light receiving elements to one microlens as in the conventional manner, since the cross-section of light fluxes incident upon the light receiving element at the exit pupil can be made small. Therefore, the lateral shift amount to the defocused amount becomes comparatively small so that the size of the light receiving element can easily be made large and thus the focus condition can effectively be detected at moving positions in a wide range of the imaging optical system 11.

In the above described embodiment, waveforms obtained for two images to be compared based on the lateral shift detection method are represented as a strength distribution of an image obtained by connecting only outputs (x mark) of odd numbered light receiving elements and a strength distribution of an image obtained by connecting only outputs (o mark) of even numbered light receiving elements, respectively. However, light fluxes incident upon adjacent light receiving elements of the light receiving element array 13 come from different image points and the microlens and respective light receiving elements are not made infinitesimally. The area of the light receiving element is generally a few hundred $\mu m^2$ an extremely small light receiving element is disadvantageous from the point of effective image receiving even if the signal to noise (SN) ratio and lateral shift are large as described above since the resolution of the imaging lens is the same as or smaller than the size of the light receiving element; the size of the microlens is finite in manufacture. Therefore, the correlation between the output distribution of an even numbered light receiving element group and the output distribution of an odd numbered light receiving element group becomes comparatively low as compared with the case of lateral shift of the completely same image.

Therefore, in the above decribed embodiment when the image projected upon the light receiving element array 13 is laterally shifted more than a certain degree, the positive or negative of an evaluation function value correctly represents the drive direction of the imaging optical system thereby detecting forwardly- or backwardly-defocused conditions, but near the in-focus position the decision of positive and negative cannot be detected correctly.

In the other embodiment according to the present invention, in case of comparing output distribution of an image obtained by connecting only outputs (x mark) of odd numbered light receiving elements shown in FIG. 5 with output distribution of an image obtained by connecting only outputs (o mark) of even numbered light receiving elements, outputs of corresponding odd numbered adjacent light receiving elements with respect to the output distribution of the odd numbered light receiving element group and outputs of corresponding even numbered adjacent light receiving elements with respect to the output distribution of the even numbered light receiving element group are subjected, respectively, to for example, a weighted mean process thereby obtaining an interpolated value resulting in a comparison of them with an output distribution obtained by inserting the interpolated values into these outputs.

Figure 6A:
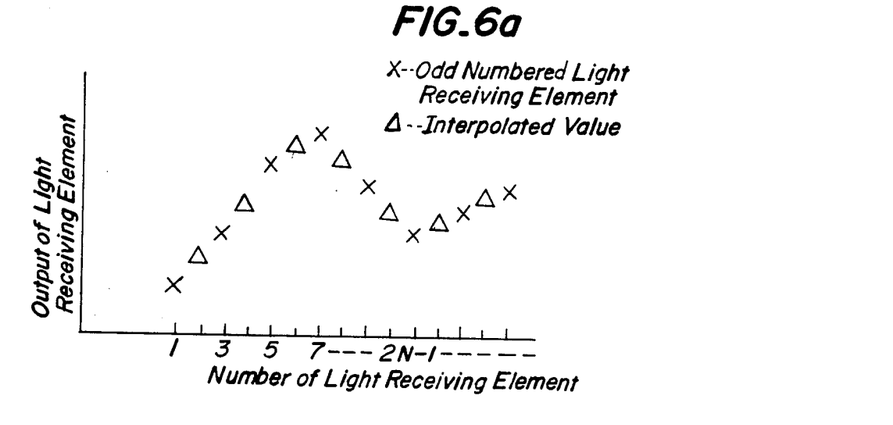
FIGS. 6a and 6b are graphs illustrating respective output distribution of a light receiving element array having odd numbered light receiving elements and a light receiving element array having even numbered light receiving elements, each with intervening interpolated values, respectively.
Figure 6B:
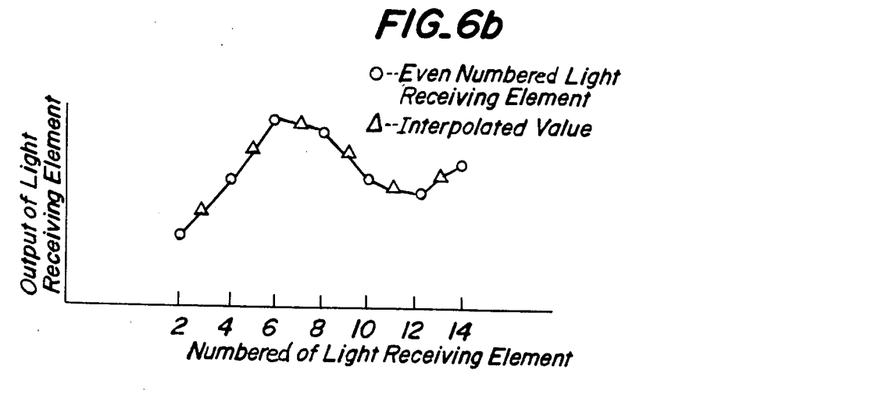

FIGS. 6a and 6b show output distribution curves obtained by inserting the above described interpolated values ($\Delta$mark) into only outputs of the odd numbered light receiving element group and only outputs of the even numbered light receiving element group. It is evident that the correlation between output distribution curves of both light receiving element groups obtained by inserting the interpolated values becomes remarkably high as compared with the correlation obtained in the case of not inserting the interpolated value.

The values to be interpolated for the output distribution of odd numbered light receiving elements seems to be that output of even numbered light receiving elements which is expected to exist adjacently and output values obtained in case of assuming the even numbered light receiving elements to be existent, and the output distribution of even numbered light receiving elements is the same as in the case of the odd numbered light receiving elements.

A brief explanation of how the interpolated values are linearly interpolated is described hereinafter.

The interpolation for the output distribution of the even numbered light receiving element group is considered. Provided that in the case of $n=1, 2, \ldots, m$, a center distance between the 2nth microlens and the $(2n+1)$th microlens is $l_1$, and a center distance between the $(2n+1)$th microlens and the $(2n+2)$th microlens is $l_2$, and assuming that the output of the 2nth light receiving element is $A_{2n}$ and the output of the $(2n+2)$th light receiving element is $A_{2n+2}$, the interpolating value $A_{2n+1}$ is obtained as follows:

$$\frac{A_{2n+1} - A_{2n}}{l_1} = \frac{A_{2n+2} - A_{2n}}{l_1 + l_2}$$

$$A_{2n+1} = \frac{l_1 A_{2n+2} + l_2 A_{2n}}{l_1 + l_2}$$

If $l_1 = l_2$ the interpolating values becomes the mean value. In the same way the output distribution of the odd numbered light receiving element group may be interpolated.

When the output distribution obtained from the odd numbered light receiving element group, including the interpolated values thus obtained and the practically measured output values of light receiving elements are $B_2, B_3, \ldots, B_{m-1}$, and the output distribution obtained from the even numbered light receiving element group is $A_2, A_3, \ldots A_{m-1}$ (except $A_1, A_m$ and $B_1, B_m$) an evaluation function F can be obtained as follows:

$$F = \sum_n \{|A_n - B_{n+1}| - |A_{n+1} - B_n|\}$$

Figure 7:
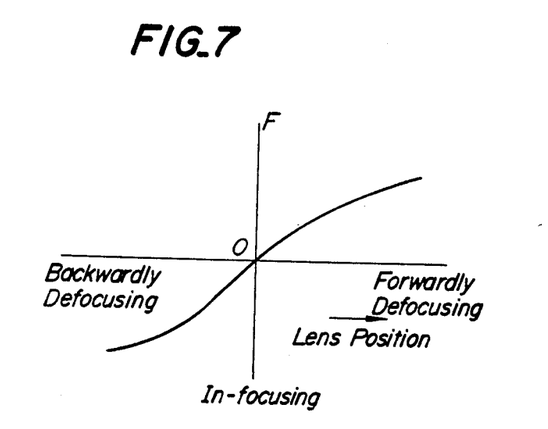
FIG. 7 is a graph showing one embodiment of the change in evaluation value of an evaluation function corresponding to a shifted position of an imaging optical system.

As is seen from a curve of the evaluation function shown in FIG. 7, the positive and negative signs of evaluation function value are inverted to each other about the in-focused position in accordance with movement of the imaging optical system so that the in-focus condition, the forwardly-defocused condition and the backwardly-defocused condition can easily be decided.

Figure 8:
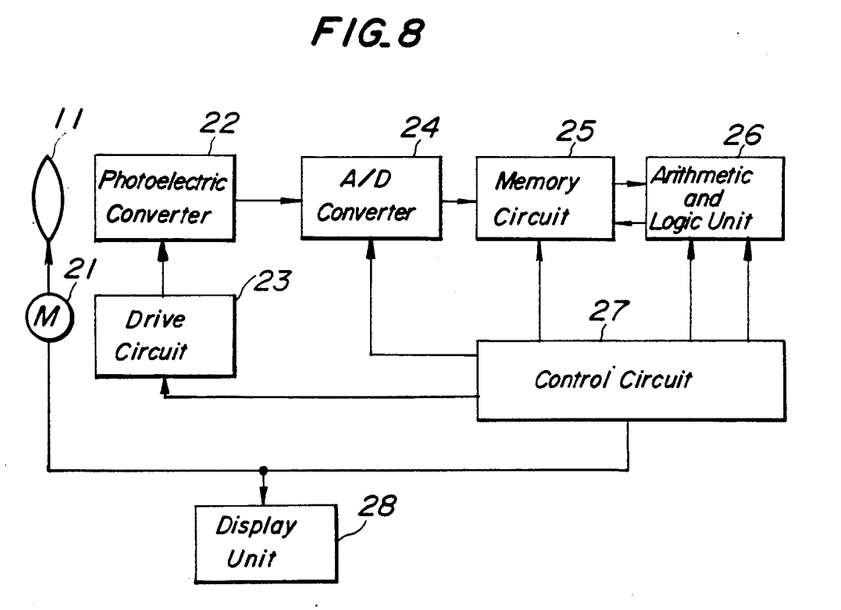
FIG. 8 is a block diagram showing one embodiment of a circuit construction of the focus condition detecting apparatus according to the present invention.

FIG. 8 is a block diagram showing a circuit construction of such a focus condition detecting apparatus.

The imaging optical system 11 may be driven and controlled by a motor 21 in the optical axis direction. A photoelectric converter 22 comprises a microlens array arranged at or near a predetermined focal plane of the imaging optical system 11 and a light receiving element array arranged at an imaging position of the microlens array as explained in FIGS. 3 and 4 in such a manner that images of the exit pupil of the imaging optical system 11 are imaged upon the light receiving element array. The light receiving element array is constructed of a solid state imaging element, for example, CCD, MOS photo-diode array or the like.

The light receiving element array provided in the photoelectronic converter 22 is driven by a start signal delivered from a drive circuit 23. The photoelectronic converter 22 generates photoelectronic converted signals in accordance with light quantity incident upon the odd numbered light receiving element group and even numbered light receiving element group of the light receiving element array after integrating them with a certain time. The output signals of the converter 22 are successively read out, respectively, and converted into digital signals respectively by an A/D converter 24 and then memorized in a memory circuit 25. The memorized values in the circuit 25 are read out by an arithmetic and logic unit 26 which arithmetically operates upon them by the given equation and generates the interpolated values with respect to the output distribution of odd numbered light receiving elements and output distribution of even numbered light receiving elements thereby forming the interpolated output distribution resulting in a formation of evaluation functions. The evaluation values thus obtained are supplied to a control circuit 27 which calculates focus conditions and supplies the calculated focus conditions to a display unit 28 thereby displaying the focus conditions therein. At the same time the circuit 27 controls the motor 21 thereby driving the imaging optical system 11 and positioning it at the predetermined focal plane automatically. The respective operation timings of the drive circuit 23, A/D converter 24, the memory circuit 25 and the arithmetic and logic unit 26 are controlled by the control circuit 27.

In this embodiment, outputs of associated odd numbered adjacent light receiving elements with respect to the output distribution of the odd numbered light receiving element group and outputs of associated even numbered adjacent light receiving elements with respect to the output distribution of the even numbered light receiving element group are subjected, respectively, to for example a weighted means process thereby obtaining interpolating values and obtaining new interpolated output distribution of a respective light receiving element group resulting in a detection of focus conditions based thereon, so that even if output distributions corresponding to respective lateral shift images obtained from respective light receiving element arrays are different from each other the focus conditions can be detected over a wide driving range of the imaging optical system with high precision.

In the above embodiment, correlation is detected by obtaining output distribution including outputs of light receiving elements and the interpolated values thereof with respect to respective groups of odd numbered and even numbered light receiving elements of the light receiving element array 13, but correlation may be detected by obtaining distribution of only interpolated values of both light receiving element groups or obtaining output distribution including outputs of light receiving elements and interpolated values thereof with respect to one light receiving element group and output distributions of only outputs of light receiving elements with respect to the other light receiving element group. Alternatively, correlation may be detected by obtaining distributions of only interpolated values with respect to one light receiving element group and output distribution of only outputs of light receiving elements with respect to the other light receiving element group. In any case focus conditions can be detected with high precision over wide moving range of the imaging optical system.

Figure 4:
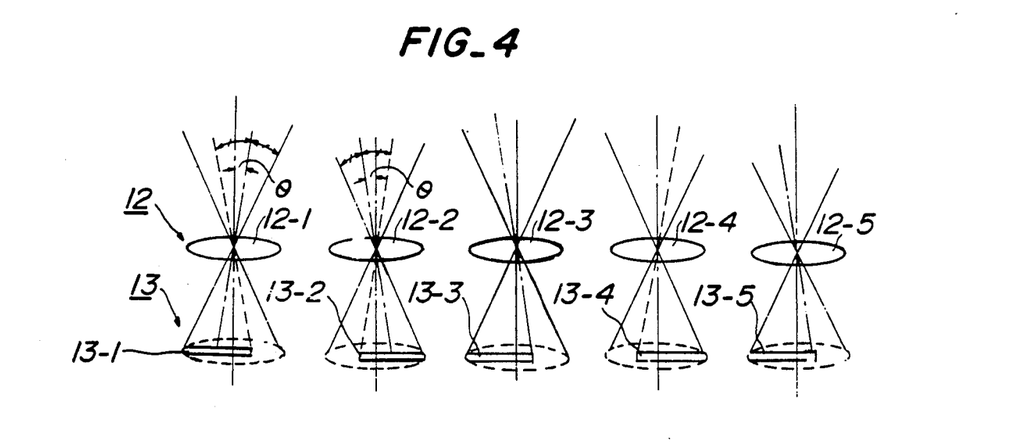
FIG. 4 is a fragmentary detailed explanatory view of the optical system shown in FIG. 3.
Figure 9:
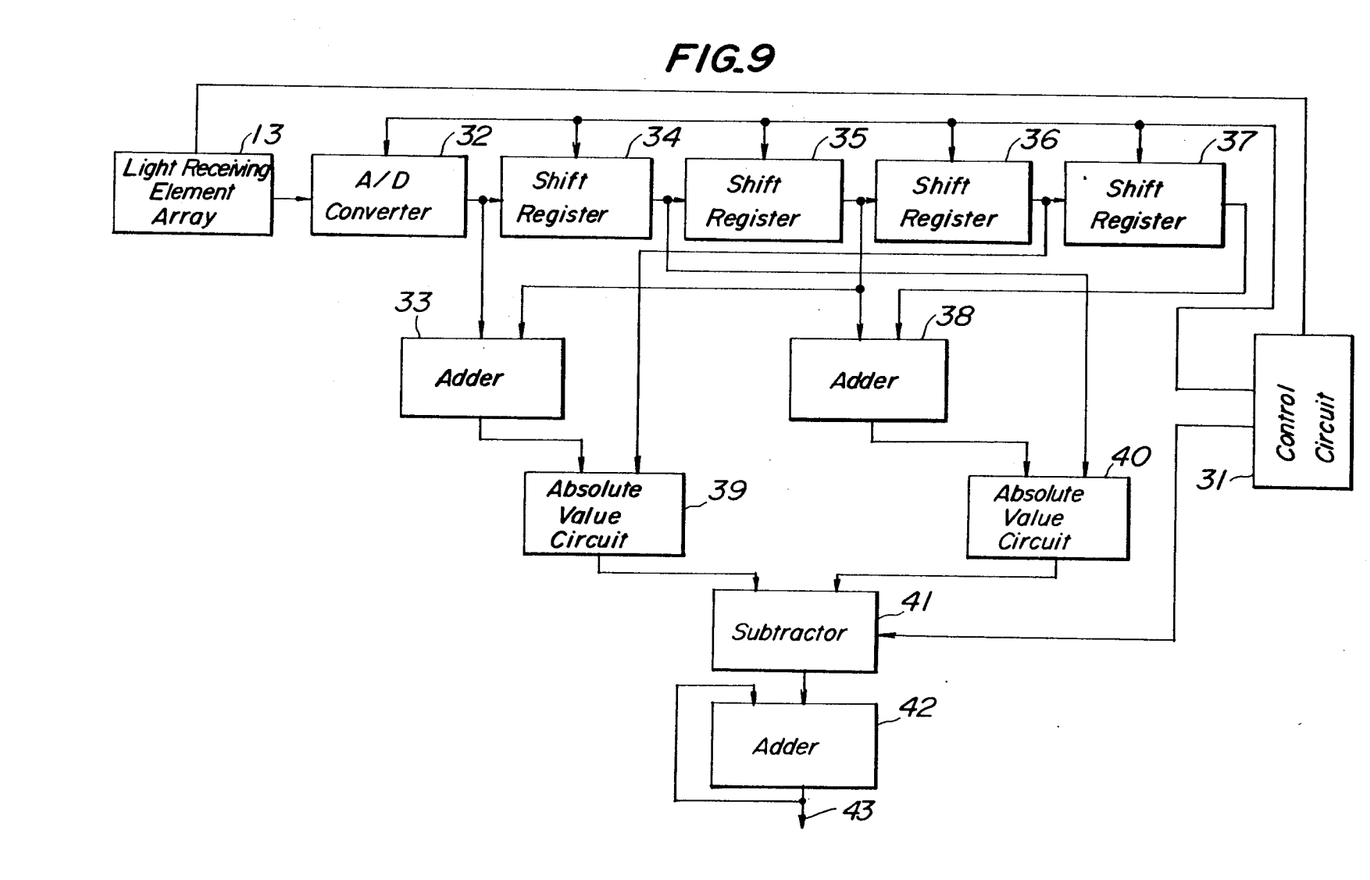
FIG. 9 is a block diagram showing another embodiment of a circuit construction of the focus condition detecting apparatus according to the present invention.

FIG. 9 is a block diagram showing another embodiment of the focus condition detecting apparatus according to the present invention. In this embodiment, provided that successive outputs of odd numbered light receiving elements of the light receiving element array 13 shown in FIGS. 3 and 4 are $\alpha_1, \alpha_2, \ldots, \alpha_n, \ldots, \alpha_m$, and successive outputs of even numbered light receiving elements are $\beta_1, \beta_2, \ldots, \beta_n, \ldots, \beta_m$, then the following evaluation function F can be obtained thereby detecting focus conditions:

$$F = \Sigma\{|(\alpha_n + \alpha_{n+1})/2 - \beta_{n+1}| - |(\alpha_{n+1} + \alpha_{n+2})/2 - \beta_n|\}$$

Figure 10:
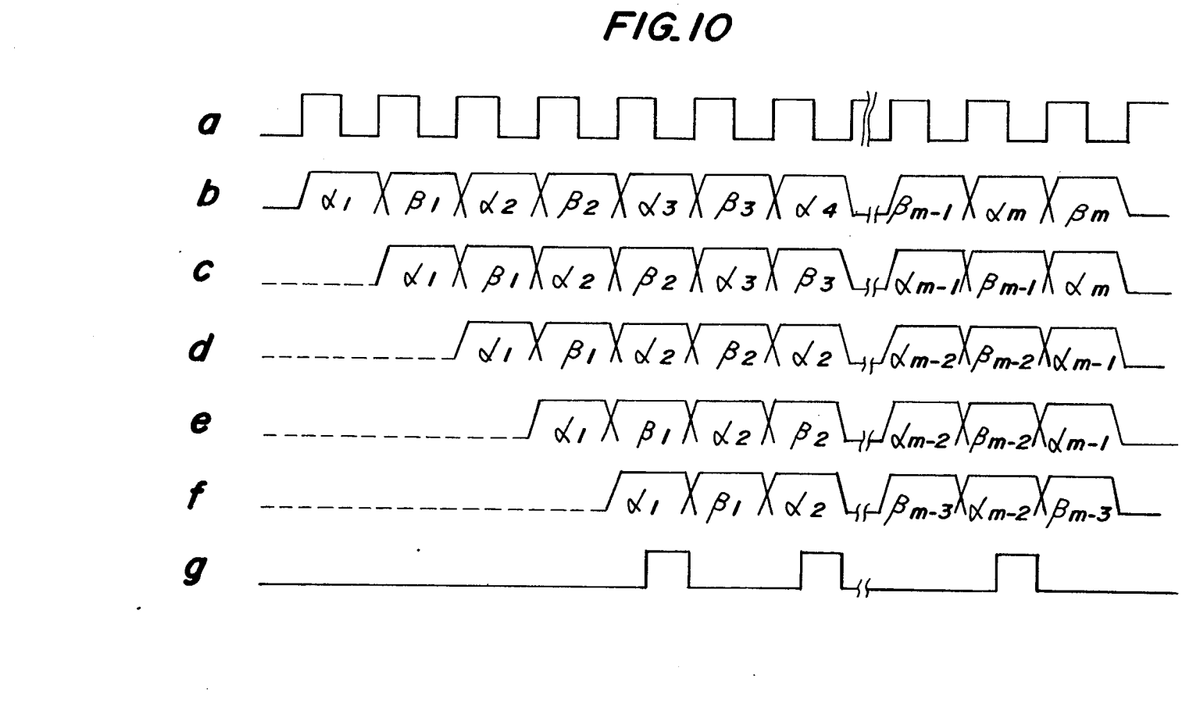
FIGS. 10a to 10g are diagrams for explaining the operation of various elements shown in FIG. 9.

That is, in this embodiment correlation exists between distribution of only interpolated values with respect to the odd numbered light receiving element group and output distribution of only outputs of light receiving elements with respect to the even numbered light receiving element group thereby obtaining focus information. In FIG. 9 a control circuit 31 reads out outputs of successive light receiving elements of the light receiving element array 13, successively, the outputs thus read out are successively converted into digital signals by an A/D converter 32, and the digital signals are supplied to one input terminal of an adder 33 and to one input terminal of an adder 38 through shift registers 34, 35, 36 and 37. FIG. 10a shows drive pulses supplied to the A/D converter 32 and shift registers 34 to 37 from the control circuit 31. In this way, when successive outputs of light receiving element array 13 are successively supplied to shift registers 34 to 37 through the A/D converter 32 outputs shown in FIGS. 10b, 10c, 10d, 10e and 10f are obtained at outputs of the A/D converter 32, and shift registers 34, 35, 36 and 37. Outputs of shift registers 35 (FIG. 10d) are supplied to respective other input terminals of adders 33 and 38, the adder 33 arithmetically operates $(\alpha_{n+1} + \alpha_{n+2})/2$, and the adder 38 arithmetically operates $(\alpha_n + \alpha_{n+1})/2$. The outputs of the adder 33 are supplied to one input terminal of an absolute value circuit 39, to the other input terminal of which the outputs (FIG. 10e) of the shift register 36 are supplied so that the absolute value circuit 39 arithmetically operates $|(\alpha_{n+1} + \alpha_{n+2})/2 - \beta_n|$. The outputs of the adder 38 are supplied to one input terminal of an absolute value circuit 40, to the other input terminal of which outputs (FIG. 10c) of the shift register 34 are supplied, so that the absolute value circuit 40 arithmetically operates $|(\alpha_n + \alpha_{n+1})/2 - \beta_{n+1}|$. The outputs of absolute value circuits 39 and 40 are supplied to a subtractor 41 thereby arithmetically operating $|(\alpha_n + \alpha_{n+1})/2 - \beta_{n+1}| - |(\alpha_{n+1} + \alpha_{n+2})/2 - \beta_n|$ and the operated outputs are supplied to an adder 42. The adder 42 generates a total sum with the timing of control pulse (FIG. 10g) from the control circuit 31 thereby obtaining an evaluation value F and supplying it to an output terminal 43 as a focus information. The evaluation value F as a focus information thus obtained has the polarity which is inverted at the in-focused position as a boundary as shown in FIG. 7 so that the focus condition can be displayed on the display circuit based on the focus information, and the imaging optical system can be automatically adjusted at the in-focused position by controlling and driving it based on the focus information.

In the above embodiment the outputs of the light receiving element array 13 are digitally treated to obtain focus information but these outputs may be treated in analog manner to obtain focus information.

Figure 11:
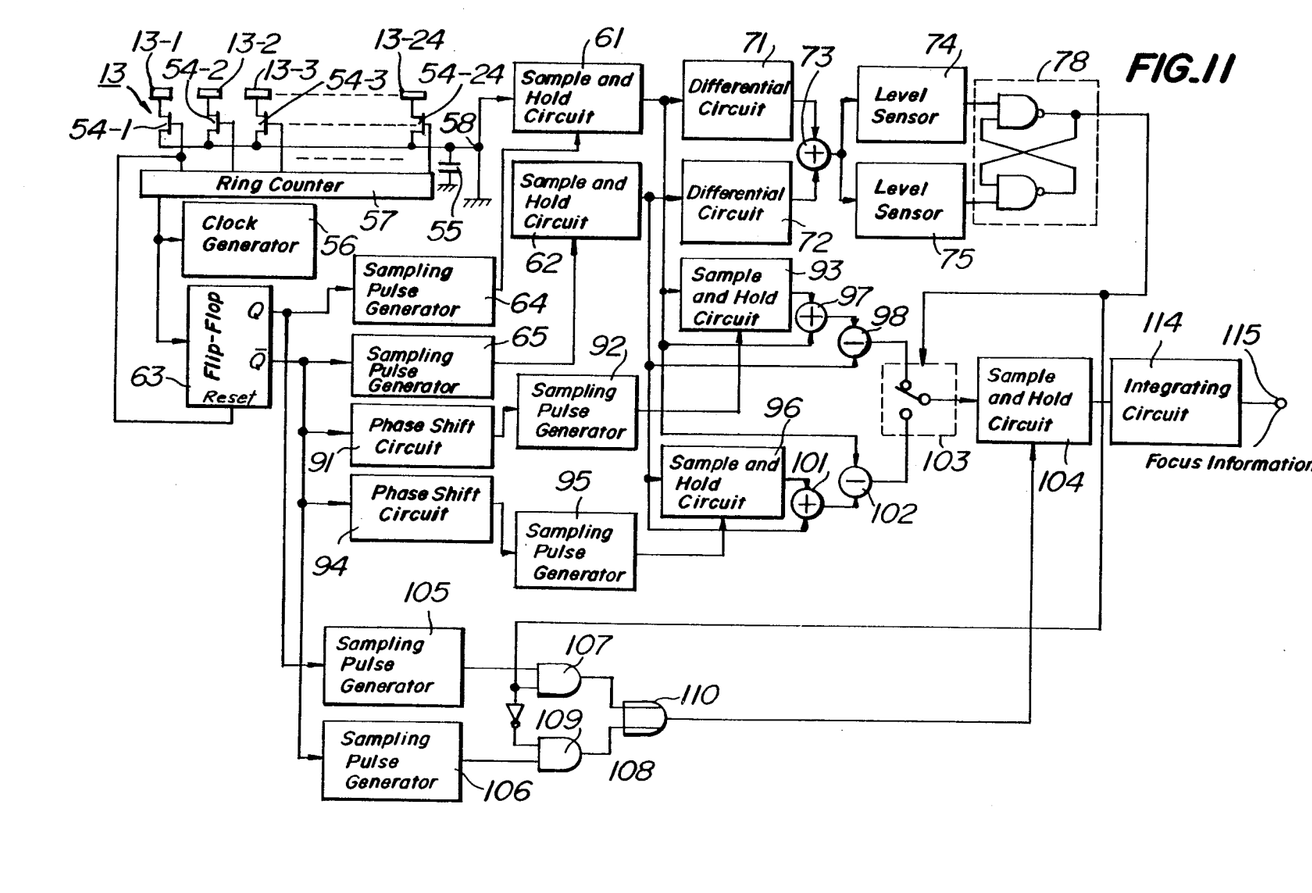
FIG. 11 is a block diagram showing a further embodiment of a circuit construction of the focus condition detecting apparatus according to the present invention.

FIG. 11 is a block diagram showing one embodiment of a circuit for treating outputs of a light receiving element array in analog manner. In this embodiment the light receiving element array 13 comprises 24 light receiving elements 13-1 to 13-24, and thus the microlens array 12 (refer to FIG. 3) also comprises 24 microlens units. The light receiving elements 13-1 to 13-24 are connected to a common capacitor 55 through respective analog gate FET's (field effect transistor) 54-1 to 54-24 which are successively and repeatedly made ON by clock signals from a clock generator 56 through a ring counter 57 so that respective photoelectronic conversion outputs of light receiving elements 13-1 to 13-24 can successively and repeatedly be read out. In this way the capacitor 55 holds an average voltage of respective photoelectronic conversion outputs of successively read out light receiving elements 13-1 to 13-24 so that noiseless time series photoelectronic conversion outputs can be obtained from an output terminal 58 of the FETs.

Figure 12:
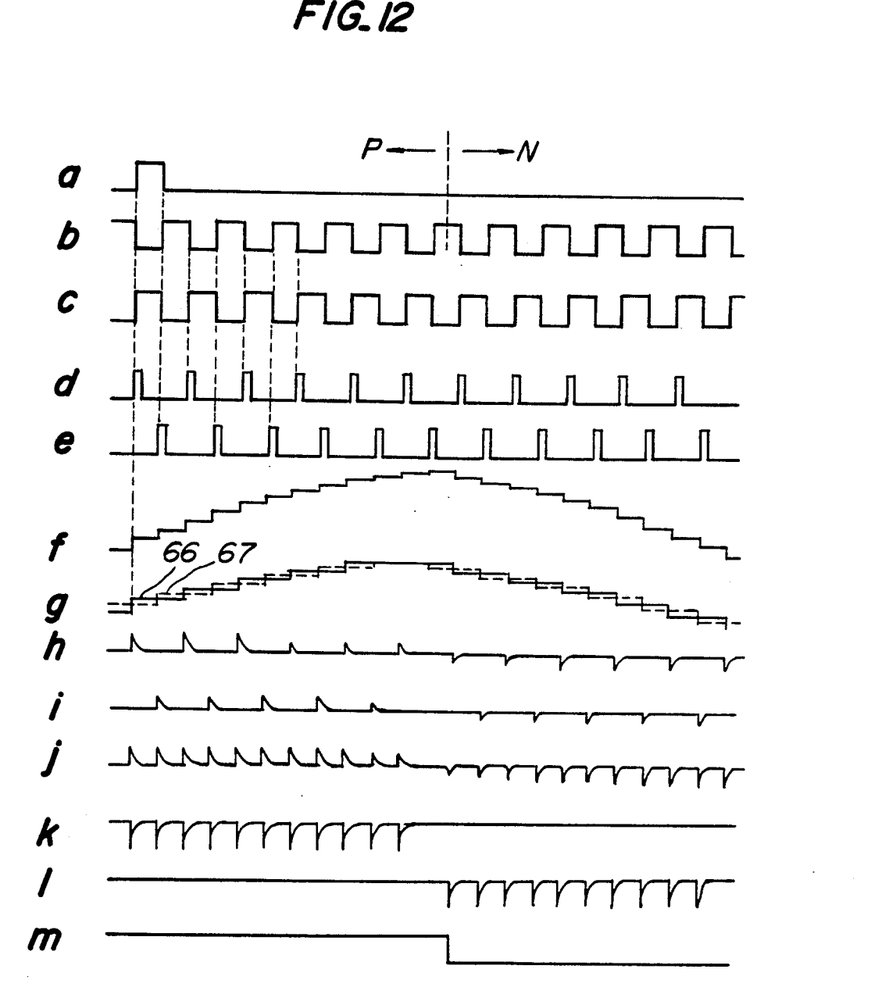
FIGS. 12a to 12m and FIGS. 13a to 13k are diagrams for explaining the operation of various elements shown in FIG. 11.

The time series photoelectronic conversion outputs of the output terminal 58 are supplied to sample and hold circuits 61 and 62, respectively. The outputs of the clock generator 56 are supplied to a flip-flop 63 and trigger it. The flip-flop 63 also receives at its reset terminal first phase signals of the ring counter 57 as shown in FIG. 12a, that is, a gate pulse supplied to the gate of the FET 54-1 for reading out photoelectronic conversion output of first light receiving element 13-1. The Q output of the flip-flop 63, therefore, becomes L level with read out timing of odd numbered light receiving elements as shown in FIG. 12b and H level with read out timing of even numbered light receiving elements while $\overline{Q}$ output of the flip-flop 63 becomes H level with read out timing of odd numbered light receiving elements and L level with read out timing of even numbered light receiving elements. The Q and $\overline{Q}$ outputs of the flip-flop 63 are supplied to sampling pulse generators 64 and 65, respectively, to generate sampling pulses in synchronism with the trailing edges of Q and $\overline{Q}$ outputs of the flip-flop 63 as shown in FIGS. 12d and 12e. These sampling pulses are supplied to the sample and hold circuits 61 and 62.

Now, assuming that time series photoelectronic conversion outputs shown in FIG. 12f are obtained from, for example, the light receiving element array 13, then the photoelectronic conversion outputs of odd numbered light receiving elements are subjected to the sample and hold process in the sample and hold circuit 61 by the sampling pulses generated from the generator 64 as shown in FIG. 12d, and the photoelectronic conversion outputs of even numbered light receiving elements are subjected to the sample and hold process in the sample and hold circuit 62 by the sampling pulses generated from the generator 65 as shown in FIG. 12e. The sample and hold circuits 61 and 62 generate photoelectronic conversion output 66 of odd numbered light receiving elements and photoelectronic conversion output 67 of even numbered light receiving elements, respectively, as shown in FIG. 12g.

Outputs of sample and hold circuits 61 and 62 are differentiated by differential circuits 71 and 72, respectively, thereby obtaining output waveforms shown in FIGS. 12h and 12i. Outputs of the differential circuits 71 and 72 are mixed by a mixer 73 thereby obtaining a output waveform shown in FIG. 12j. The output of the mixer 73 is supplied to level sensors 74 and 75. The level sensor 74 detects a differential pulse having positive polarity and its threshold voltage is set at a level shown in FIG. 12j by 76 so that the sensor 74 generates an output having L level in case of detecting the differential pulse higher than this threshold voltage. The output waveform of the level sensor 74 is shown in FIG. 12k.

The level sensor 75 detects a differential pulse having negative polarity and its threshold voltage is set at a level shown in FIG. 12j by 77 so that the sensor 75 generates an output having L level in case of detecting the differential pulse lower than this threshold voltage. The output waveform of the level sensor 75 is shown in FIG. 12l. The outputs of the level sensors 74 and 75 are supplied to reset and present input terminals of and R-S flip-flop 78, respectively.

In this way, the R-S flip-flop 78 generates a polarity discrimination signal of an H level (FIG. 12m) at a region P (positive polarity region) in which the time series photoelectronic conversion output is increased as shown in FIG. 12f and generates a polarity discrimination signal of an L level (FIG. 12m) at a region N (negative polarity region) in which time series photoelectronic conversion output is decreased as shown in FIG. 12f.

Figure 13:
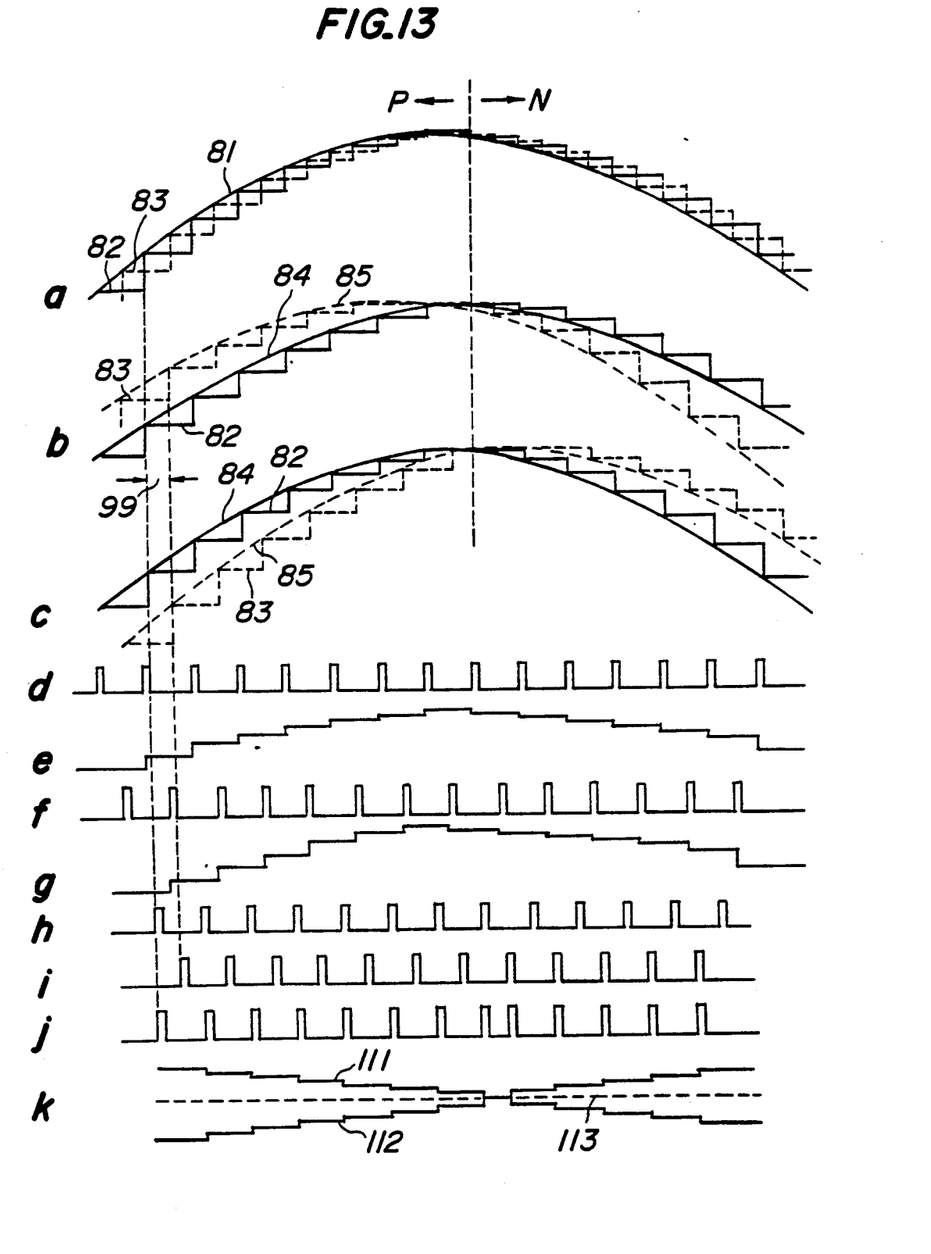

In the in-focused condition, images projected upon the odd numbered light receiving element group and the even numbered light receiving element group of the array 13 substantially correspond with each other and its illumination distribution is shown in, for example, FIG. 13a by 81. In this case a reference 82 shows an output waveform of the sample and hold circuit 61 for sampling the photoelectronic conversion output of odd numbered light receiving elements and a reference 83 shows an output waveform of the sample and hold circuit 62 for sampling the photoelectronic conversion output of even numbered light receiving elements. As seen from FIG. 13a, in the in-focus condition, assuming that the sample and hold level of even 2nth light receiving element is $V_{2n}$, and the sample and hold levels of odd $(2n-1)$ and $(2n+1)$th light receiving elements are $V_{2n-1}$ and $V_{2n+1}$, then the following relation is obtained: $V_{2n} \approx (V_{2n-1} + V_{2n+1})/2$. While in the in-focus condition, assuming that the sample and hold level of odd $(2m+1)$th light receiving element is $V_{2m+1}$ and the sample and hold levels of even 2m and $(2m+2)$th light receiving elements are $V_{2m}$ and $V_{2m+2}$, the following relation is obtained: $V_{2m+1} \approx (V_{2m} + V_{2m+2})/2$. This is the reason that samplings of odd numbered light receiving elements and even numbered light receiving elements are performed alternately and the sampling of even numbered light receiving elements is performed at the center of the sampling period of odd numbered light receiving elements. This relation is always realized so far as the contrast is not changed abruptly in one light receiving element. On the contrary, in case of shifting the focus in the forwardly-defocused direction the illumination distribution 84 of the odd numbered light receiving element group is shifted toward the right side with respect to the illumination distribution 85 of the even numbered light receiving element group as shown in FIG. 13b so that the above described relation cannot be obtained. That is, the following relations are obtained in the positive polarity region P: $V_{2n} > (V_{2n-1} + V_{2n+1})/2$, $V_{2m+1} < (V_{2m} + V_{2m+2})/2$. This relation becomes inverse in the negative polarity region N. In case of shifting the focus in the backwardly-defocused direction the illumination distribution 84 of the odd numbered light receiving element group is shifted toward the left side with respect to the illumination distribution 85 of the even numbered light receiving element group as shown in FIG. 13c so that the following relations are obtained in the positive polarity region P: $V_{2n} < (V_{2n-1} + V_{2n+1})/2$, $V_{2m+1} > (V_{2m} + V_{2m+2}(/2$. This relation becomes inverse in the negative polarity region N. These relations are inverse to each other between forwardly- and backwardly-defocused conditions.

In this embodiment as described above, the focus information is detected by utilizing the fact that relations between $V_{2n}$ and $(V_{2n-1}+V_{2n+1})/2$ (interpolating value of the even numbered light receiving element group) and between $V_{2m+1}$ and $(V_{2m}+V_{2m+2})/2$ (interpolating value of the odd numbered light receiving element group) are changed in accordance with focus conditions.

As shown in FIG. 11 the $\overline{Q}$ outputs of the flip-flop 63 are supplied to a sampling pulse generator 92 through a phase shift circuit 91 as read out timing output of even numbered light receiving elements. The sampling pulse generator 92 generates sampling pulses just before read out timing of odd numbered light receiving elements as shown in FIG. 13d. The sampling pulses are supplied to a sample and hold circuit 93 which samples and holds outputs of the sample and hold circuit 61. The output waveform of the sample and hold circuit 93 is shown in FIG. 13e. This output waveform represents a waveform that the output of the sample and hold circuit 61 is delayed in analog manner by one period (for example, one period length of odd timing). The Q outputs of the flip-flop 63 are supplied to a sampling pulse generator 95 through a phase shift circuit 94 as read out timing output of odd numbered light receiving elements. The sampling pulse generator 95 generates sampling pulses just before read out timing of even numbered light receiving elements as shown in FIG. 13f. The sampling pulses are supplied to a sample and hold circuit 96 which samples and holds outputs of the sample and hold circuit 62. The output waveform of the sample and hold circuit 96 is shown in FIG. 13g. This output waveform represents a waveform that the output of the sample and hold circuit 62 is delayed in analog manner by one period (for example, one period length of even timing) in the same manner as in FIG. 13e.

The outputs of the sample and hold circuit 93 are supplied to one input terminal of a mixer 97 having a mixing ratio of 1:1, to the other input terminal of which the outputs of the sample and hold circuit 61 are supplied. The mixer 97 generates an intermediate voltage between the output voltage of the sample and hold circuit 61 and the output voltage of the sample and hold circuit 93, that is, the output voltage of $(V_{2n-1}+V_{2n+1})/2$ being an interpolating value between adjacent light receiving elements of the odd numbered light receiving element group. The outputs of the mixer 97 are supplied to a negative input terminal of a difference detection circuit 98 which receives at its positive input terminal the sample and hold outputs $V_{2n}$ of the even 2nth light receiving element from the sample and hold circuit 62 so that the difference detection circuit 98 detects the difference therebetween, that is, $\{V_{2n}-(V_{2n-1}+V_{2n+1})/2\}$. In the case of the in-focused condition, the difference detection circuit 98 generates zero voltage since the relation $(V_{2n-1}+V_{2n+1})/2 \approx V_{2n}$ is obtained. In case of shifting the focus in the forwardly-defocused direction, the difference detection circuit 98 generates a voltage going to positive direction in proportion to the defocused amount at the positive polarity region P and the phase portion (shown in FIG. 13b by 99) between the read out timing of an odd numbered light receiving element and the read out timing of the next even numbered light receiving element since the relation $V_{2n}>(V_{2n-1}+V_{2n+1})/2$ is obtained, and generates a voltage going to negative direction in proportion to the defocused amount at the negative polarity region N and the phase portion (shown in FIG. 13b by 100) between the read out timing of an even numbered light receiving element and the read out timing of the next odd numbered light receiving element since the relation $V_{2n}>(V_{2n-1}+V_{2n+1})/2$ is obtained. In case of shifting the focus in the backwardly-defocused direction the difference detection circuit 98 generates voltages having the relation opposite to that of the above forwardly-defocused condition.

The outputs of the sample and hold circuit 96 are supplied to one input terminal of a mixer 101 having a mixing ratio of 1:1, to the other input terminal of which the outputs of the sample and hold circuit 62 are supplied. The mixer 101 generates an intermediate voltage between the output voltage of the sample and hold circuit 62 and the output voltage of the sample and hold circuit 96, that is, the output voltage of $(V_{2m}+V_{2m+2})/2$ being an interpolating value between adjacent light receiving elements of even numbered light receiving elements. The outputs of the mixer 101 are supplied to a negative input terminal of a difference detection circuit 102 which receives at its positive input terminal the sample and hold outputs $V_{2m+1}$ of the odd (2m+1)th light receiving element from the sample and hold circuit 61 so that the difference detection circuit 102 detects the difference therebetween, that is, $\{V_{2m+1}-(V_{2m}+V_{2m+2})/2\}$. The difference detection circuit 102 generates zero voltage in the case of the in-focused condition, a voltage going to negative direction in proportion to the defocused amount at the positive polarity region P in the case of the defocused condition in the forwardly-defocused direction, and a voltage going to positive direction in proportion to the defocused amount at the negative polarity region N in the case of the defocused condition in the forwardly-defocused direction. In case of shifting the focus in the backwardly-defocused direction the difference detection circuit 102 generates voltages having the relation opposite to that of the above forwardly-defocused condition.

The outputs of the difference detection circuits 98 and 102 are supplied to an analog switch 103. The analog switch 103 changes over to the difference detection circuit 98 by H level of the polarity discrimination signal from the R-S flip-flop 78, i.e., at the positive polarity region P and to the difference detection circuit 102 by L level of the polarity discrimination signal, i.e. at the negative polarity region N, so that the analog switch 103 generates focus information having the same sign irrespective of the positive and negative polarity regions P and N. Such focus informations can be obtained only at the odd numbered timing phase portion 99 in the positive polarity region P and at the even numbered timing phase portion 100 in the negative polarity region N as shown in FIG. 13b. To this end the outputs of the analog switch 103 are supplied to a sample and hold circuit 104 thereby sampling and holding at the phase portions.

The outputs of the analog switch 103 are sampled as follows:

Q and $\overline{Q}$ outputs of the flip-flop 63 are supplied to sampling pulse generators 105 and 106, respectively, thereby generating sampling pulses at respective trailing edges of input signals as shown in FIGS. 13h and 13i. The sampling pulses generated from the generator 105 coincide with odd numbered timing as shown in FIG. 13h and the sampling pulses generated from the generator 106 coincide with even numbered timing as shown in FIG. 13i. Outputs of sampling pulse generators 105 and 106 are supplied to one input terminal of AND circuits 107 and 108, respectively. The polarity discrimination signals from the R-S flip-flop 78 are supplied to the other input terminal of the AND circuit 107 and to the other input terminal of the AND circuit 108 through an inverter 109 so that the AND circuit 107 becomes ON only in the positive polarity region P and the AND circuit 108 becomes ON only in the negative polarity region N. Outputs of the AND circuits 107 and 108 are supplied to an OR circuit 110 which supplies its outputs as a sampling pulse to the sample and hold circuit 104, to which outputs of the analog switch 103 are supplied, so that at the positive polarity region P sampling pulses generated with odd numbered timing are supplied to the sample and hold circuit 104 by the Q output of the flip-flop 73, and at the negative polarity region N sampling pulses generated with even numbered timing are supplied to the circuit 104 by the $\overline{Q}$ output of the flip-flop 73 so that the output of the circuit 104 becomes a voltage having positive polarity as shown in FIG. 13k by 111 in the case of defocused condition n the forwardly-defocused direction and a voltage having negative polarity as shown in FIG. 13k by 112 in the case of defocused condition in the backwardly-defocused direction. In the case of the in-focus condition the output voltage of the difference detection circuits 98 and 102 becomes zero voltage so that the output of the sample and hold circuit 104 becomes zero voltage as shown in FIG. 13k by 113. The outputs of the sample and hold circuit 104 are supplied to an integrating circuit 114. In this way, focus information an be obtained from an output terminal 115 comprising zero voltage in the case of in-focus condition and a voltage having positive and negative polarities in proportion to the shifted amount in the case of shifting focus in the forwardly- and backwardly-defocused directions so that the focus condition can be displayed at the display circuit based on the focus information and the imaging optical system can be driven and controlled by the focus information thereby automatically adjusting it to the in-focus condition.

It is further understood by those skilled in the art that the forgoing description is a preferred embodiment of the disclosed device and that various changes and modifications may be made in the invention without departing from the spirit and scope thereof.

For example, the light receiving elements may be arranged such that the cross-sections of light fluxes incident upon respective adjacent light receiving elements at the exit pupil does not include an optical axis. Moreover, outputs of light receiving elements may be weighted in accordance with a distance between centers of successive light flux dividing elements instead of one half weight.

What is claimed is:

1. An apparatus for detecting a focus condition of an imaging optical system having a focal plane comprising:
    light flux dividing means having a plurality of light flux dividing elements arranged in said focal plane or near a plane conjugated with said focal plane;
    photoelectric conversion means having a plurality of light receiving elements arranged in a linear array and paired with respective ones of said flux dividing elements to receive light fluxes divided by respective ones of said light flux dividing elements and so arranged that the cross-section of light fluxes incident upon the respective light receiving elements at the exit pupil of the imaging optical system includes regions which are not overlapped with each other; and
    means for detecting focus conditions of the imaging optical system based on the outputs of the light receiving elements.

2. An apparatus for detecting a focus condition of an imaging optical system as claimed in claim 1, wherein respective light fluxes incident upon respective adjacent light receiving elements of the photoelectric conversion means cross the optical axis of the imaging optical system at the exit pupil of the imaging optical system.

3. An apparatus for detecting a focus condition of an imaging optical system as claimed in claim 1, wherein the respective light flux dividing elements include imaging means for forming images of their respective fluxes.

4. An apparatus for detecting a focus condition of an imaging optical system having a focal plane comprising:
    light flux dividing means having a plurality of light flux dividing elements arranged in said focal plane or near a plane conjugated with said focal plane;
    photoelectric conversion means having a plurality of light receiving elements arranged to receive light fluxes divided by respective ones of said light flux dividing elements and so arranged that the cross-section of light fluxes incident upon the respective light receiving elements at the exit pupil of the imaging optical system includes regions which are not overlapped with each other; and
    means for detecting focus conditions of the imaging optical system based on the outputs of the light receiving elements, wherein the focus condition detecting means includes means for interpolating outputs of light receiving elements of at least one of light receiving groups which consist of odd numbered light receiving elements and even numbered light receiving elements of the photoelectric conversion means.

5. An apparatus for detecting a focus condition of an imaging optical system as claimed in claim 4, wherein the interpolating means weights outputs of light receiving elements in accordance with a distance between centers of successive light flux dividing elements.

6. An apparatus for detecting a focus condition of an imaging optical system as claimed in claim 5, wherein said means for detecting includes distribution detecting means for detecting a correlation of output distributions of light receiving element groups consisting of odd numbered and even numbered light receiving elements of the photoelectric conversion means by obtaining output distribution of the outputs and their interpolated values of both light receiving element groups.

7. An apparatus for detecting a focus condition of an imaging optical system as claimed in claim 5, wherein said means for detecting includes distribution detecting means for detecting a correlation of output distributions of light receiving element groups consisting of odd numbered and even numbered light receiving elements of the photoelectric conversion means by obtaining an output distribution of their outputs and the interpolated values of both light receiving element groups.

8. An apparatus for detecting a focus condition of an imaging optical system as claimed in claim 5, wherein said means for detecting includes distribution detecting means for detecting a correlation of output distributions of odd numbered and even numbered light receiving element groups of the photoelectric conversion means by obtaining an output distribution of only interpolated values of one light receiving element group and an output distribution of only outputs of the other light receiving element group.

9. An apparatus for detecting a focus condition of an imaging optical system as claimed in claim 5, wherein said means for detecting includes distribution detecting means for detecting a correlation of output distributions of odd numbered and even numbered light receiving element groups of the photoelectric conversion means by obtaining output distributions of only interpolated values of both light receiving element groups.

* * * * *